(12) United States Patent
Benchaib et al.

(10) Patent No.: US 8,531,852 B2
(45) Date of Patent: Sep. 10, 2013

(54) SYSTEM AND A METHOD FOR CONTROLLING AT LEAST ONE VOLTAGE CONVERTER HAVING A PLURALITY OF CELLS IN SERIES

(75) Inventors: Abdelkrim Benchaib, Montigny le Bretonneux (FR); Serge Poullain, Meudon (FR)

(73) Assignee: Alstom Grid SAS, La Defense Cedex (FR)

( * ) Notice: Subject to any disclaimer, the term of this patent is extended or adjusted under 35 U.S.C. 154(b) by 249 days.

(21) Appl. No.: 13/125,046

(22) PCT Filed: Oct. 19, 2009

(86) PCT No.: PCT/EP2009/063642
§ 371 (c)(1),
(2), (4) Date: Jun. 7, 2011

(87) PCT Pub. No.: WO2010/046331
PCT Pub. Date: Apr. 29, 2010

(65) Prior Publication Data
US 2011/0285437 A1 Nov. 24, 2011

(30) Foreign Application Priority Data
Oct. 21, 2008 (FR) ...................................... 08 57130

(51) Int. Cl.
*H02J 1/10* (2006.01)
*H02J 1/02* (2006.01)
*H02M 7/48* (2007.01)
*G05F 1/00* (2006.01)
*G05F 5/00* (2006.01)

(52) U.S. Cl.
USPC ................. 363/65; 363/71; 363/39; 323/272; 323/207

(58) Field of Classification Search
USPC ............... 363/35, 37, 39, 40, 43, 132, 65, 71; 323/207
See application file for complete search history.

(56) References Cited

U.S. PATENT DOCUMENTS

| 5,642,275 | A | * | 6/1997 | Peng et al. | ..................... 363/137 |
| 7,638,983 | B2 | * | 12/2009 | Park et al. | ...................... 322/20 |

(Continued)

FOREIGN PATENT DOCUMENTS
EP     0 911 950     4/1999

OTHER PUBLICATIONS

Benchaib, A. et al., "Industrial D-STATCOM Chain Link Modelling and Control," IEEE 2007 European Conference on Power Electronics and Applications, Sep. 2007, pp. 1-9.

(Continued)

*Primary Examiner* — Bao Q Vu
*Assistant Examiner* — Zekre Tsehaye
(74) *Attorney, Agent, or Firm* — Nixon Peabody LLP

(57) ABSTRACT

A method of controlling at least one voltage converter having a plurality of cells in series, comprising an AC part and a DC part, characterized in that the AC input voltage (Vei) of each cell is determined directly by the use of a high speed current control loop relating to the AC part and a lower speed voltage control loop relating to the cells, the method including choosing the following voltage control law:

$$\Psi_i = \frac{C_i}{2}\left(\frac{2}{R_{pi}C_i}Z_i + \frac{d}{dt}Z_{i\_ref} - K_{1Zi} - K_{2Zi}\mathrm{sign}(E_{Zi})\right)$$

where:
  $K_{1zi}$ and $K_{2zi}$ are positive adjustment gains;
  $C_i$ is the continuous capacitance of the capacitor $C_i$ of each cell;
  $R_{pi}$ is the losses associated with each cell;
  $Z_{i\_ref}$ is the reference value of $Z_i = (U_{DCi})^2$, $U_{DCi}$; being the direct voltage across the capacitor $C_i$; and
  $E_{Zi}$ is such that $E_{Zi} = Z_i - Z_{i\_ref}$.

7 Claims, 15 Drawing Sheets

(56) References Cited

U.S. PATENT DOCUMENTS 7,663,268 B2 * 2/2010 Wen et al. .................. 307/82
7,710,082 B2 * 5/2010 Valderrama et al. ......... 323/207

OTHER PUBLICATIONS

Voraphonpiput, N. et al., "Analysis and Performance Investigation of a Cascaded Multilevel STATCOM for Power System Voltage Regulation," International Energy Journal, vol. 8, Issue 2, Jun. 2007, 8 pages.

El-Moursi, M. S. et al., "Novel Controllers for the 48-Pulse VSC STATCOM and SSSC for Voltage Regulation and Reactive Power Compensation," IEEE Transactions on Power Systems, vol. 20, No. 4, Nov. 2005, pp. 1985-1997.

International Search Report in International Application No. PCT/EP2009/063642, mailed Jan. 25, 2010.

French Search Report in French Application No. FR 0857130, dated Jul. 7, 2009.

\* cited by examiner

SYSTEM AND A METHOD FOR CONTROLLING AT LEAST ONE VOLTAGE CONVERTER HAVING A PLURALITY OF CELLS IN SERIES

CROSS REFERENCE TO RELATED APPLICATIONS OR PRIORITY CLAIM

This application is a National Phase of PCT/EP2009/063642, filed Oct. 19,2009, entitled, "SYSTEM AND METHOD FOR CONTROLLING AT LEAST ONE VOLTAGE CONVERTER WITH SEVERAL CELLS IN SERIES", and which claims priority of French Patent Application No. 08 57130, filed Oct. 21, 2008.

TECHNICAL FIELD

This invention relates to a system and to a method for controlling at least one voltage converter having a plurality of cells in series, which may be a converter of the type known as a chain link static synchronous compensator (or "chain link STATCOM").

In order to simplify the description given below, it relates by way of example to a voltage converter having a plurality of cells and being of the chain link STATCOM type.

PRESENT STATE OF THE PRIOR ART

In a very high voltage power distribution network, the electricity is generated by alternators in the form of three-phase alternating current (AC), and the voltage is then increased to very high voltage by step-up transformers before being transported on the distribution network. The very high voltage enables the power to be transported over long distances, while lightening structures, and minimizing losses by heating. It does however remain limited by problems of insulation of the equipment, and by electromagnetic radiation effects. The level of the very high voltage that offers a good compromise extends from 400 kilovolts (kV) to 800 kV.

To enable the power to go between a source and a receiver, it is necessary for the voltage at the source to be at a phase offset of angle θ relative to the voltage at the receiver. This angle θ is called the internal angle of the power line, or transmission angle.

If $V_s$ is the voltage on the source end, $V_r$ the voltage on the receiver end, and X1 the purely inductive impedance of the line, the active power P and reactive power Q supplied by the source are given by the following expressions respectively:

$$P = \frac{V_s V_r}{X1} \sin\theta$$

$$Q = \frac{V_s^2 - V_s V_r \cos\theta}{X1}$$

$$P_{max} = \frac{V_s V_r}{X1}$$

These expressions show that the active and reactive powers transmitted on an inductive line are a function of the voltages $V_s$ and $V_r$, the impedance X1, and the transmission angle θ.

In order to augment the power that can be transmitted over the line, it is accordingly possible to proceed in the following three ways:

To augment the voltages $V_s$ and $V_r$. The insulating distance of the installation, and the space called for in dimensioning the installation, at once impose a limitation on this approach. The radiated electromagnetic field is greater. There is therefore an environmental impact to be taken into account. In addition, the equipment is more expensive and is costly to maintain.

To act on the transmission angle θ. This angle is a function of the active power supplied by the generators. The maximum angle corresponding to $P_{max}$ is θ=π/2. For larger angles, the process enters the descending part of the P=f(θ) curve, which is an unstable zone. To work with angles θ that are too large is to risk losing control of the power system, especially in the event of a transient fault—for example grounding of the phases—on the system where return to normal operation gives rise to a transient increase in the transmission angle in order to evacuate the energy that was produced while the fault condition subsisted, and that was unable to be used by the load and was therefore stored as kinetic energy in the rotors of the generators. It is thus imperative that this angle does not exceed the limit of stability.

To act on the value of the impedance X1, which is caused to diminish by connecting a capacitor in series with the line, thereby compensating for the reactive power generated by the power transmission line itself. For a given transmission angle, the transmissible power rises as the value of the impedance X1 falls.

The use of flexible alternating current transmission systems (FACTS), which are electronic power devices with a high speed of response, for controlling the active power, opens up new perspectives for better use of power transmission systems. They permit continuous and rapid action on the various parameters of the system such as phase offset, voltage, and impedance. Power transfers are therefore better controlled, and voltages better maintained, thereby enabling margins of stability to be widened, while also moving towards the power transmission lines being used to transfer the largest currents possible, at the limit of the thermal capacity of these high and very high voltage lines.

FACTS can be grouped in two families, namely parallel FACTS and series FACTS, which are as follows:

The parallel FACTS consist in particular of: Mechanical Switched Capacitor (MSC) systems; Static Var Compensator (SVC) systems; and Static Synchronous Compensator (STATCOM) systems.

The series FACTS consist in particular of: Fixed Capacitor (FC) systems; Thyristor Switched Series Capacitor (TCSC) systems; and Static Synchronous Series Compensator (SSSC) systems.

It is the STATCOM systems that have the reputation of being reactive power controllers of the future; they can be used in the same way as a synchronous compensator (synchronous machine). The STATCOM can provide dynamic compensation of the voltage, increase transient stability, and improve the damping of a power transmission or distribution network.

A STATCOM is an electronic power apparatus connected in parallel, which injects into the power transmission system an alternating current that is controlled in phase and in amplitude. The amplitude of the voltages modulated by the converter (in phase with the system voltages), enables reactive power to be absorbed or supplied. It thus provides dynamic adjustment of the production or consumption of reactive power. It is also capable of damping transient power oscillations.

The main function of a STATCOM is to provide support for the voltage at critical points in a power transmission and distribution network, by injecting a reactive current into the system. In general, the reactive current injected by a STAT- COM is proportional to the difference in voltage between the STATCOM and the system itself. In consequence the control of the reactive current depends on control of the voltage by the converter.

A specific STATCOM topology is based on the assembly of a plurality of standard circuits consisting of converters, and referred to herein as cells; this is known as a Chain Link STATCOM. Besides the control of the reactive current supplied by such a converter, the main problem to be resolved is that of distribution of the total voltage over each cell of the converter.

The document referenced [1] at the end of this description gives a model for a chain link STATCOM, together with some simplified control laws for it. However:

firstly, having regard to the approximations of modeling and control, the existing control laws do not have a very high degree of robustness (there are parametric variations, harmonics, and so on), nor is dynamic performance good; and secondly, there is no general method of the analytic control of a number N of cells connected in series for this type of converter (association of N cells connected as an H bridge, controlled by pulse width modulation (PWM)).

The object of the invention is to propose a system and a method that make use of a novel control law to give better distribution of the total voltage to each cell of a chain link STATCOM converter.

SUMMARY OF THE INVENTION

The invention provides a control system for at least one voltage converter having a plurality of cells in series, wherein the module and phase components of an input voltage Vei relative to a frame of reference (d, q) are delivered to each cell, comprising an AC part and a DC part, the system being characterized in that it includes a high speed current control loop relating to the AC part that delivers a control voltage Ve, and a lower speed voltage control loop relating to the cells that delivers an active power ψi, such that:

$$\Psi_i = \frac{C_i}{2}\left(\frac{2}{R_{pi}C_i}Z_i + \frac{d}{dt}Z_{i\_ref} - K_{1Zi}E_{Zi} - K_{2Zi}\text{sign}(E_{Zi})\right)$$

where:
$K_{1zi}$ and $K_{2zi}$ are positive adjustment gains;
$C_i$ is the continuous capacitance of the capacitor Ci of each cell;
$R_{pi}$ is the losses associated with each cell;
$Z_{i\_ref}$ is the referenced value of $Z_i=(U_{DCi})^2$, $U_{DCi}$ being the direct voltage across the capacitor $C_i$; and
$E_{Zi}$ is such that $E_{Zi}=Z_i-Z_{i\_ref}$.
in that the link between these two control loops is obtained via the consumption of active power in the cells representing the output of the lower speed control loop, and
in that it comprises means for obtaining a current reference $i_{e\_ref}^d$ for the high speed control loop by effecting the summation $\Sigma\psi_i$ of the active power consumptions in the N cells with $$i_{e\_ref}^d = \frac{\sum_{i=1}^{N}\Psi_i - V_e^q i_{e\_ref}^q}{V_e^d},$$

and by making use of a phase locked loop on the control voltage $V_e$.

The system of the invention may with advantage further include a phase locked loop on the total output voltage component of the AC part. It may with advantage further include a module for error correction in the phase locked loop, such that the total output voltage component of the AC part is given by the following equation:

$$V_e = V_{ePLL} + K_{PLL}\sum_{i=1}^{N}\left(\int_0^1 E_{Zi}dt\right)$$

where:

$$K_{PLL}\sum_{i=1}^{N}\left(\int_0^1 E_{Zi}dt\right)$$

is a correction term;
$K_{PLL}$ is the adjustment gain; and
$E_{Zi}$ is the error in tracking the square of the DC voltage.

It may with advantage include a module for delivering to the cells module and phase components relative to a frame of reference (d, q). It may with advantage comprise a chain link STATCOM converter on each phase of a three-phase power distribution network.

The invention also provides a method of controlling at least one voltage converter having a plurality of cells in series, wherein the module and phase components of an input voltage Vei relative to a frame of reference (d, q) are delivered to each cell, comprising an AC part and a DC part, the method being characterized in that the AC (Vei) input voltage of each cell is determined directly by the use of a high speed current control loop relating to the AC part that delivers a control voltage Ve, and a lower speed voltage control loop relating to the cells that delivers an active power ψi, such that:

$$\Psi_i = \frac{C_i}{2}\left(\frac{2}{R_{pi}C_i}Z_i + \frac{d}{dt}Z_{i\_ref} - K_{1Zi}E_{Zi} - K_{2Zi}\text{sign}(E_{Zi})\right)$$

where:
$K_{1zi}$ and $K_{2zi}$ are positive adjustment gains;
Ci is the continuous capacitance of the capacitor Ci of each cell;
$R_{pi}$ is the losses associated with each cell;
$Z_{i\_ref}$ is the referenced value of $Z_i=(U_{DCi})^2$, $U_{DCi}$ being the direct voltage across the capacitor $C_i$; and
$E_{Zi}$ is such that $E_{Zi}=Z_i-Z_{i\_ref}$.
in that the link between these two control loops is obtained via the consumption of active power in the cells representing the output of the lower speed control loop, and
in that a current reference $i_{e\_ref}^d$ is derived for the high speed control loop by effecting the summation $\Sigma\psi_i$ of the active power consumptions in the N cells with $$i_{e\_ref}^d = \frac{\sum_{i=1}^{N}\Psi_i - V_e^q i_{e\_ref}^q}{V_e^d},$$

and by making use of a phase locked loop on the control voltage $V_e$.

Advantageously, the method may further include the use of a phase locked loop on the total output voltage component of the AC part.

Use may with advantage also be made of error correction in the phase locked loop, such that the total output voltage component of the AC part is given by the following equation:

$$V_e = V_{ePLL} + K_{PLL} \sum_{i=1}^{N} \left( \int_0^1 E_{Zi} dt \right)$$

where:

$$K_{PLL} \sum_{i=1}^{N} \left( \int_0^1 E_{Zi} dt \right)$$

is a correction term;
$K_{PLL}$ is the adjustment gain; and
$E_{Zi}$ is the error in tracking the square of the DC voltage.

Advantageously, module and phase components relative to a frame of reference (d, q) are delivered to the cells.

Advantageously, a chain link STATCOM converter is used on each phase of a three-phase power distribution network.

The proposed invention rests on the following features:
introduction of a dynamic model of the converter, extended to a number N of cells connected in series;
application of control techniques, on the dynamic model so developed, that are non-linear, robust and generalized to N cells; and
improvement of the phase locked loop (PLL) proposed so as to improve resolution of the measured voltage and current vectors that are necessary for the control law into their components in a frame of reference (d, q).

The system and method of the invention therefore have the following advantages:
modeling of the converter generalized for N cells connected in series;
formulation of a general control law that is valid regardless of the number of cells connected in series;
validity of the control law regardless of the type of electronic power circuit making use of pulse width modulation;
robustness of the control law against any parametric variations in a chain link STATCOM converter; and
good dynamic response.

DETAILED DESCRIPTION OF PARTICULAR EMBODIMENTS

A STATCOM converter with a plurality of cells in series, such as that described in the document referenced [2], comprises, for each phase, N cells 12 connected in series. The DC voltage of each of these cells is monitored by controlling the active component of the current. In addition the reactive component of the current is controlled in order to adjust the control of voltage $V_{res}$ in the power line of the transmission system.

Figure 1:
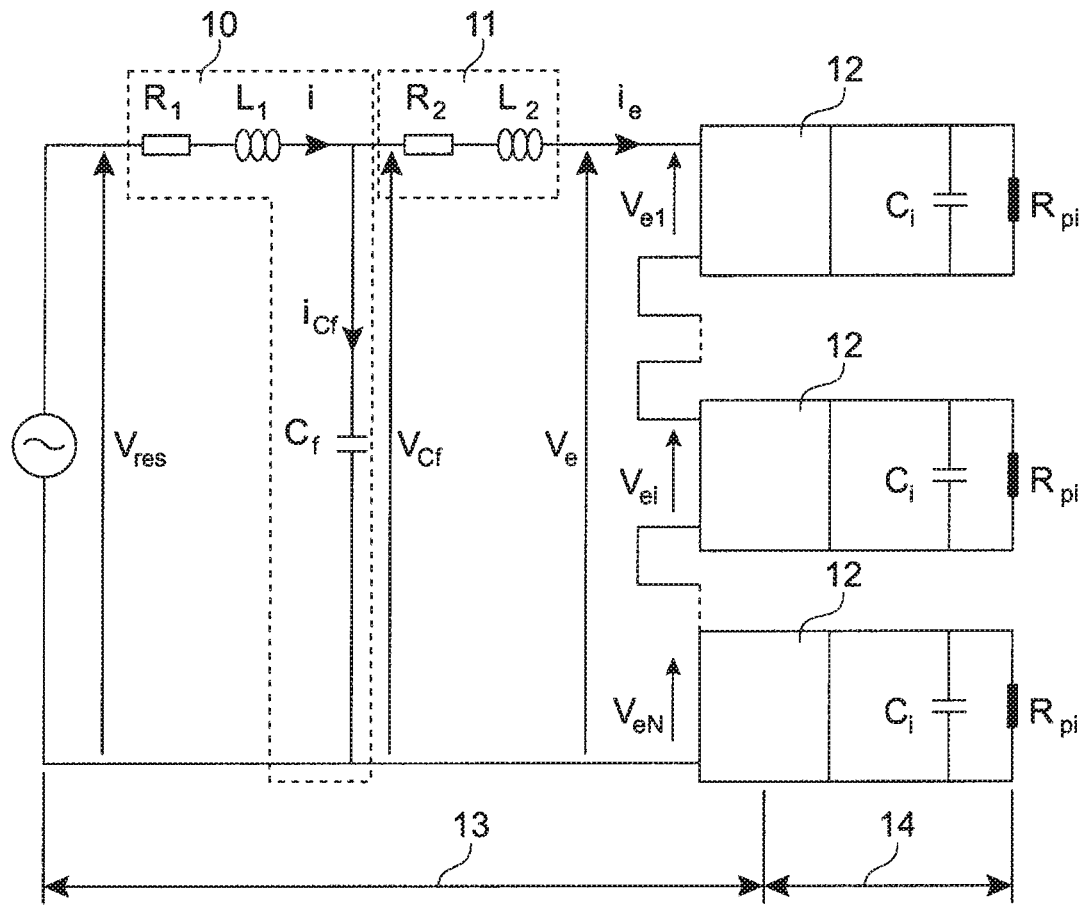
FIG. 1 shows a configuration of a single-phase chain link STATCOM system of the prior art but making use of the method of this invention.

The diagram of such a single phase chain link STATCOM system, with an AC (alternating current) part 13 and a DC (direct current) part 14, is shown in FIG. 1. It includes a high frequency (HF) filter 10 consisting of a resistor R1, an inductor L1 and a capacitor Cf, together with a transformer 11, the impedance of which is represented by the resistance R2 and inductance L2. The capacitance of the capacitor of each cell 12 is given by Ci (i=1, ... N), while the losses associated with each cell are represented by the impedance $R_{pi}$ (i=1, ... N).

Considering the AC part 13 of the system, associated with the HF filter 10 and transformer 11, the following equation gives the voltage on the distribution network:

$$V_{ref} = R_1 i + L_1 \frac{d}{dt} i + V_{cf} \tag{1}$$

and $$i_e = i - i_{cf} \tag{2}$$

The voltage across the capacitor Cf is given by the equation:

$$\frac{d}{dt} V_{cf} = \frac{1}{C_f} i_{cf} \tag{3}$$

then, by substituting equation (2) into equation (3) we get:

$$\frac{d}{dt} V_{cf} = \frac{1}{C_f} i - \frac{1}{C_f} i_e \tag{4}$$

It is also possible to get the following relationship:

$$V_{cf} = R_2 i_e + L_2 \frac{d}{dt} i_e + V_e \tag{5}$$

By combining equations (1), (4) and (5), the behavior of the circuit of the AC part 13 in FIG. 1 is given by the following set of differential equations:

$$\begin{cases} \frac{d}{dt} i = -\frac{R_1}{L_1} i - \frac{1}{L_1} V_{cf} + \frac{1}{L_1} V_{res} \\ \frac{d}{dt} V_{cf} = \frac{1}{C_f} i - \frac{1}{C_f} i_e \\ \frac{d}{dt} i_e = -\frac{R_2}{L_2} i_e + \frac{1}{L_2} V_{cf} - \frac{1}{L_2} V_e \end{cases} \tag{6}$$

Figure 2:
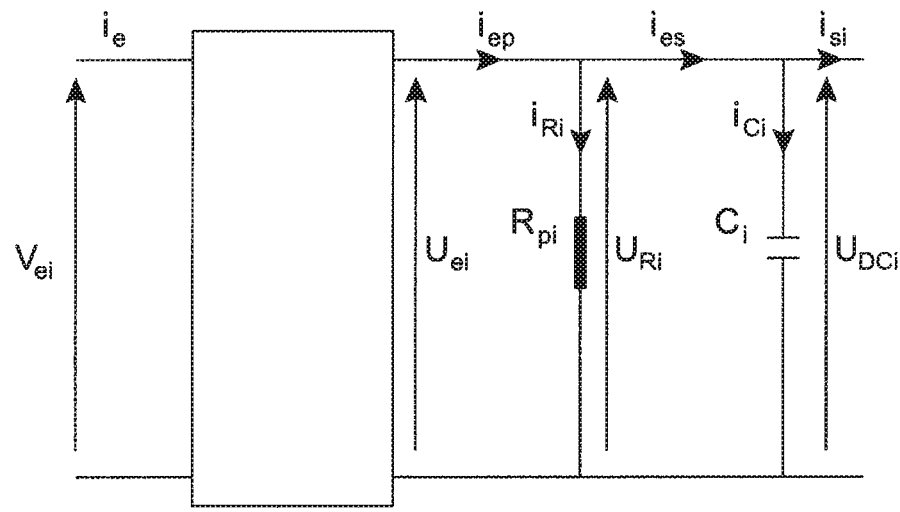
FIG. 2 is a diagram of one of the DC cells that are connected in series in the same configuration of the prior art.

If we now consider the circuit shown in FIG. 2, we get:

$$\begin{cases} \dfrac{d}{dt}U_{DC_i} = \dfrac{1}{C_i}i_{C_i} \\ i_{C_i} = i_{es} - i_{si} = i_{ep} - i_{R_i} - i_{si} \\ i_{R_i} = \dfrac{U_{R_i}}{R_{p_i}} = \dfrac{U_{ei}}{R_{p_i}} \end{cases} \quad (7)$$

We then get the following expression for the DC voltage across the capacitor Ci of one cell 12, as shown in FIG. 2:

$$\frac{d}{dt}U_{DC_i} = \frac{1}{C_i}i_{ep} - \frac{1}{C_i}i_{si} - \frac{1}{R_{p_i}C_i}U_{ei} \quad (8)$$

Since no load is connected in the DC part of the system:

$$i_{si}=0 \quad (9)$$

So equation (8) becomes:

$$\frac{d}{dt}U_{DC_i} = \frac{1}{C_i}i_{ep} - \frac{1}{R_{p_i}C_i}U_{ei} \quad (10)$$

In addition, we have:

$$U_{DC_i}=U_{R_i}=U_{ei} \quad (11)$$

So equation (10) be put in the following form:

$$\frac{d}{dt}U_{DC_i} = \frac{1}{C_i}i_{ep} - \frac{1}{R_{p_i}C_i}U_{DC_i} \quad (12)$$

The relationship between the inputs and outputs of AC and DC voltages and currents is given by the following equation:

$$\begin{bmatrix} i_e \\ V_{ei} \end{bmatrix} = \begin{bmatrix} \dfrac{1}{W_{Ri}(t)} & 0 \\ 0 & W_{Ri}(t) \end{bmatrix} \begin{bmatrix} i_{ep} \\ U_{ei} \end{bmatrix} \quad (13)$$

We are now obtaining a mathematical model that describes the behavior of the electrical diagram seen in FIG. 2, by combining equations (12) and (13) as follows:

$$\begin{cases} \dfrac{d}{dt}U_{DC_i} = -\dfrac{1}{R_{p_i}C_i}U_{DC_i} + \dfrac{1}{C_i}W_{Ri}(t)i_e \\ V_{ei} = W_{Ri}(t)U_{DC_i} \end{cases} \quad (14)$$

The model of the system is then given by associating equations (6) and (14) with the following output filter voltage:

$$V_e = V_{e1} + V_{e2} + \ldots + V_{eN} = \sum_{i=1}^{N} V_{ei} \quad (16)$$

So we get:

$$\begin{cases} \dfrac{d}{dt}i = -\dfrac{R_1}{L_1}i - \dfrac{1}{L_1}V_{cf} + \dfrac{1}{L_1}V_{res} \\ \dfrac{d}{dt}V_{cf} = \dfrac{1}{C_f}i - \dfrac{1}{C_f}i_e \\ \dfrac{d}{dt}i_e = -\dfrac{R_2}{L_2}i_e + \dfrac{1}{L_2}V_{cf} - \dfrac{1}{L_2}V_e \\ V_e = V_{e1} + V_{e2} + V_{e3} + V_{e4} + \sum_{i=1}^{4} V_{ei} \\ V_{ei} = W_{Ri}(t)U_{DC_i}, \, i=1,\ldots,N \\ \dfrac{d}{dt}U_{DC_i} = -\dfrac{1}{R_{p_i}C_i}U_{DC_i} + \dfrac{1}{C_i}W_{Ri}(t)i_e \end{cases} \quad (17)$$

The above model is not very useful if it is desired to control the transfer of active power between the AC part and the DC part. It is therefore proposed to control the square of the value of the voltages, $(U_{DC_i})^2$. We then have the following definition:

$$Z_i = (U_{DC_i})^2 \quad (18)$$

The time derivative of this is:

$$\frac{d}{dt}Z_i = -\frac{2}{R_{p_i}C_i}Z_i + \frac{2}{C_i}U_{DC_i}W_{Ri}(t)i_e \quad (19)$$

Using the second equation of (14), we get:

$$\frac{d}{dt}Z_i = -\frac{2}{R_{p_i}C_i}Z_i + \frac{2}{C_i}V_{ei}i_e \quad (20)$$

The active power transfer in the system is represented by:

$$\begin{cases} P = \sum_{i=1}^{N} P_i \\ P_i = V_{ei}i_e \end{cases} \quad (21)$$

The system of equations (17) may be rewritten as follows:

(22)

$$\begin{cases} \dfrac{d}{dt}i = -\dfrac{R_1}{L_1}i - \dfrac{1}{L_1}V_{cf} + \dfrac{1}{L_1}V_{res} & (e) \\ \dfrac{d}{dt}V_{cf} = \dfrac{1}{C_f}i - \dfrac{1}{C_f}i_e & (f) \\ \dfrac{d}{dt}i_e = -\dfrac{R_2}{L_2}i_e + \dfrac{1}{L_2}V_{cf} - \dfrac{1}{L_2}V_e & (a) \\ V_e^d = \sum_{i=1}^{N} V_{ei}^d & (b) \\ V_e^q = \sum_{i=1}^{N} V_{ei}^q & (c) \\ \dfrac{d}{dt}Z_i = -\dfrac{2}{R_{p_i}C_i}Z_i + \dfrac{2}{C_i}(V_{ei}^d i_e^d + V_{ei}^q i_e^q) \to i=1,\ldots,N & (d) \end{cases}$$

Equations (22e), (22f) and 22(a) represent the AC part of the system of the invention, while equations (22b) and (22c)

represent the voltage distribution link between the total voltage $V_e$ at the output of the AC part and the AC input on each cell 12. The behavior of each cell 12 is finally given by equation (22d), in which the term $(V_{ei}^d i_e^d + V_{ei}^q i_e^q)$ is the active power exchanged.

Figure 3:
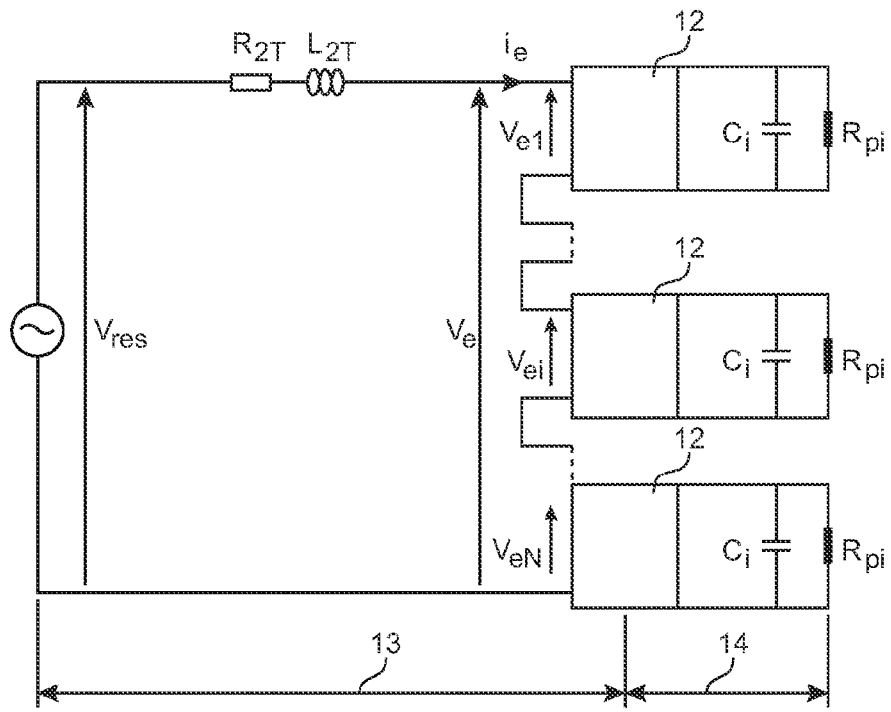
FIG. 3 shows a simplified single-phase chain link STATCOM system making use of the method of this invention.

If we neglect the high frequency filter in the range of working frequencies, the electrical circuit to be controlled, and shown in the diagram of FIG. 1, may be simplified as shown in FIG. 3.

The model for the state of this system is given by the following equations:

$$\begin{cases} \dfrac{d}{dt} i_e = -\dfrac{R_{2T}}{L_{2T}} i_e + \dfrac{1}{L_{2T}} V_{cf} - \dfrac{1}{L_{2T}} V_e & (a) \\[4pt] V_e^d = \sum_{i=1}^{N} V_{ei}^d & (b) \\[4pt] V_e^q = \sum_{i=1}^{N} V_{ei}^q & (c) \\[4pt] \dfrac{d}{dt} Z_i = -\dfrac{2}{R_{pi} C_i} Z_i + \dfrac{2}{C_i} (V_{ei}^d i_e^d + V_{ei}^q i_e^q) \to i = 1, \ldots, N & (d) \end{cases} \quad (23)$$

The system of equation (23) is used for the whole control synthesis. In the control diagram, it is supposed that the system represents a connection based on the time of two control loops. The first control loop (20), having a rapid dynamic (high speed) given by the equation (23a), relates to the AC part. The second control loop (21), having a slower dynamic (lower speed), and relating to the cells, is given by equation (23d). The link between these two loops 20 and 21 is the voltage as resolved into components in the frame of reference (d, q) as illustrated by equations (23b) and (23c).

A high speed current control circuit 22, and a means 23 for generating a sinusoidal signal, are shown in the high speed control loop 20. A lower speed voltage control circuit 24 is shown in the lower speed control loop 21 that relates to the cells, this circuit delivering the active power $\psi_i$.

The link between these two control loops 20 and 21 is obtained via the consumption of active power in the cells representing the output of the lower speed control loop 21.

Figure 4:
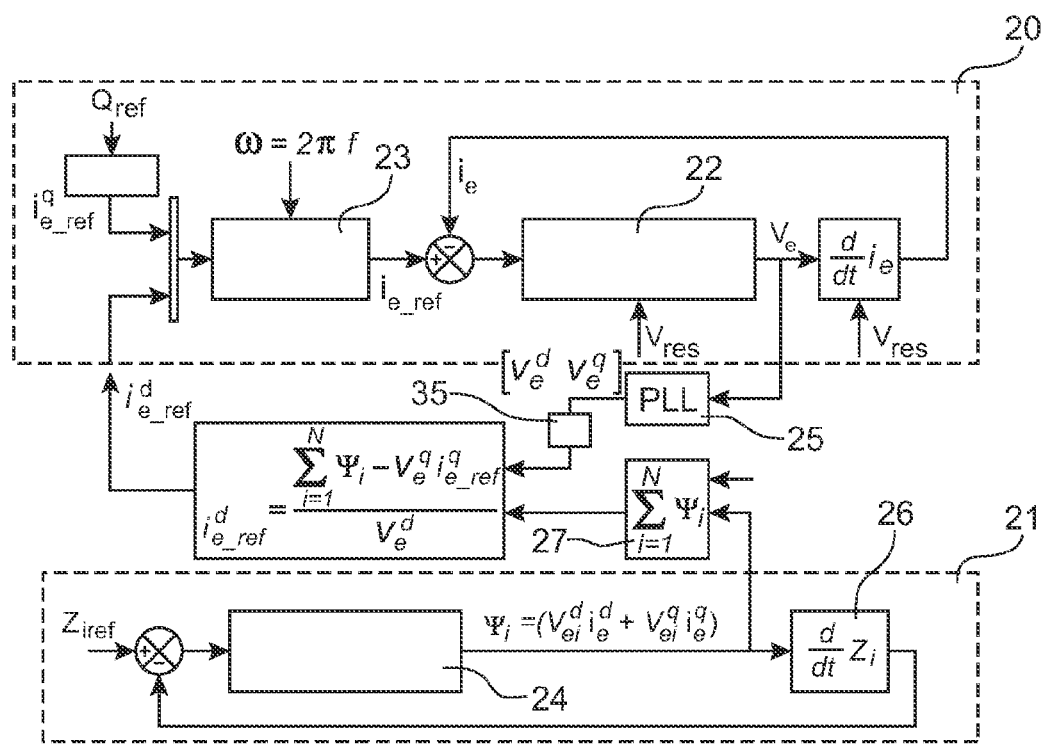
FIG. 4 shows the voltage and current control system of the invention.

The current reference $i_{e\_ref}^d$ is derived for the high speed control loop 20 by effecting the summation $\Sigma \psi_i$ (see reference numeral 27 in FIG. 4) of the active power consumptions in the N cells. This is possible by means of the use of two voltage control loops, one high speed and one lower speed, the current reference $i_{e\_ref}^d$ delivered by the lower speed loop being seen as a variable with slow variation (i.e. a constant variable) derived from the faster loop. The interconnected control algorithm is obtained in FIG. 4 by making use of a phase locked loop (PLL) 25 on the control voltage $V_e$.

If equation (23d) is now considered, the lower speed voltage control circuit 24 is differentiated in a differentiator module 26, using a method in accordance with the Lyapunov theory. If the following quantity is considered:

$$\psi_i = V_{ei}^d i_e^d + V_{ei}^q i_e^q \quad (24)$$

Equation (23d) can be rewritten as follows:

$$\dfrac{d}{dt} Z_i = -\dfrac{2}{R_{pi} C_i} Z_i + \dfrac{2}{C_i} \psi_i \quad (25)$$

Let us consider the following Lyapunov function:

$$V_{Lyap} = \dfrac{1}{2} E_{Zi}^2 \quad (26)$$

where $E_{zi} = Z_i - Z_{i\_ref}$ is the error in tracking the square of the DC voltage. The differential of the Lyapunov function is given by:

$$\dfrac{d}{dt} V_{Lyap} = E_{Zi} \left( -\dfrac{2}{R_{pi} C_i} Z_i + \dfrac{2}{C_i} \psi_i - \dfrac{d}{dt} Z_{i\_ref} \right) \quad (27)$$

The above equation is defined as negative by choosing the following voltage control law in accordance with the invention:

$$\psi_i = \dfrac{C_i}{2} \left( \dfrac{2}{R_{pi} C_i} Z_i + \dfrac{d}{dt} Z_{i\_ref} - K_{1Zi} E_{Zi} - K_{2Zi} \mathrm{sign}(E_{Zi}) \right) \quad (28)$$

where $K_{1zi}$ and $K_{2zi}$ are positive adjustment gains.

In the same way we may consider equation (23a) with the associated Lyapunov equation given by $$V_{ie} = \dfrac{1}{2} E_{ie}^2 \quad (29)$$

where $E_{ie} = i_e - i_{e\_ref}$. In the same way, the control law that causes the tracking error $E_{ie}$ to converge towards zero is given by $$V_e = L_{2T} \left( k_{1\_ie} E_{ie} - k_{2\_ie} \mathrm{sign}(E_{ie}) - \dfrac{R_{2T}}{L_{2T}} i_e + \dfrac{1}{L_{2T}} V_{res} - \dfrac{d}{dt} i_{e\_ref} \right) \quad (30)$$

where $k_{1\_ie}$ and $k_{2\_ie}$ are positive adjustment gains.

From equations (24), (23b) and (23c) we get:

$$\sum_{i=1}^{4} \psi_i = V_e^d i_e^d + V_e^q i_e^q \quad (31)$$

Therefore the current component d is calculated by:

$$i_e^d = \dfrac{\sum_{i=1}^{4} \psi_i - V_e^q i_e^q}{V_e^d} \quad (32)$$

Thus we have, below, the reference component d of the current $i_{e\_ref}$ for the high speed control loop:

$$i_{e\_ref}^d = \dfrac{\sum_{i=1}^{4} \psi_i - V_e^q i_e^q}{V_e^d} \quad (33)$$

Given that the current reference $i_{e\_ref}^d$ is given by an external loop, the reference of AC current $i_{e\_ref}^d$ can be calculated as follows:

$$i_{e\_ref} = i_{e\_ref}^d \cos(\omega t) - i_{e\_ref}^q \sin(\omega t) \qquad (34)$$

where $\omega = 2\pi f$, f being the frequency of the power distribution network.

Figure 5:
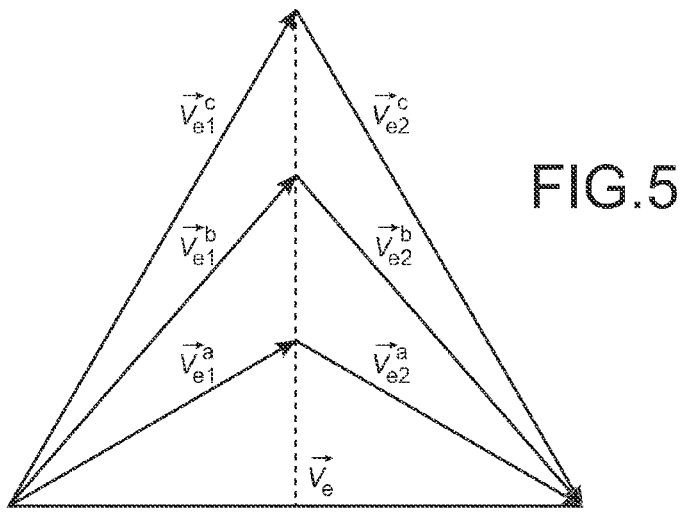
FIG. 5 shows the generation of distributed voltage with the same vector modules (infinite number of solutions) in accordance with the prior art.

If we suppose that there are only two cells in the system, then there is an infinite number of solutions to generate $\vec{V}_{e1}$ and $\vec{V}_{e2}$ if the same module is considered for all of the vectors. FIG. 5 accordingly presents three solutions. It would be the same for N cells.

In order to improve the system of the invention, the module and phase components are delivered to the cells relative to a frame of reference (d, q) of each voltage $\vec{V}_{ei}$. Considering the total voltage $\vec{V}_e = [V_e^d V_e^q]^T$, the distributed voltages $\vec{V}_{ei} = [V_{ei}^d V_{ei}^q]^T$ cannot be calculated at once by fixing the same module for each vector and by deducing their corresponding phases. It is necessary to apply an additional constraint to the distributed voltages. There are two possible ways to do this, as follows.

Method 1

The same component d is used for all of the distributed voltages.

$$V_{ei}^d = V_{e1}^d = V_{e2}^d = \ldots = V_{eN}^d = \frac{V_e^d}{N} \qquad (35)$$

From equation (25) we get:

$$V_{ei}^q = \frac{\Psi_i - V_{ei}^d i_e^d}{i_e^q} \qquad (36)$$

Substituting equations (33) and (35) in equation (36), we get the following distributed voltage component q:

$$V_{ei}^q = \frac{1}{i_e^q} \Psi_i - \frac{\sum_{i=1}^N \Psi_i - V_e^d i_e^d}{N i_e^q} \qquad (37)$$

The distributed voltages to be supplied to the cells are expressed as:

$$V_{ei} = \begin{bmatrix} V_{ei}^d \\ V_{ei}^q \end{bmatrix} = \begin{bmatrix} \dfrac{V_e^d}{N} \\ \dfrac{1}{i_e^q} \Psi_i - \dfrac{\sum_{i=1}^N \Psi_i - V_e^d i_e^d}{N i_e^q} \end{bmatrix} \qquad (38)$$

It should be noted that the above relationship is not applicable where $i_e^q = 0$.

Method 2

The same component q is used for all the voltages.

$$V_{ei}^q = V_{e1}^q = V_{e2}^q = \ldots = V_{eN}^q = \frac{V_e^q}{N} \qquad (39)$$

From equation (25) we get:

$$V_{ei}^d = \frac{\Psi_i - V_{ei}^q i_e^q}{i_e^d} \qquad (40)$$

Substituting equations (33) and (39) in equation (40), we get:

$$V_{ei}^d = \frac{V_e^d}{\sum_{i=1}^N \Psi_i - V_e^q i_e^q} \left( \Psi_i - \frac{V_e^q i_e^q}{N} \right) \qquad (41)$$

The distributed voltages to be supplied to the cells are expressed as follows:

$$V_{ei} = \begin{bmatrix} V_{ei}^d \\ V_{ei}^q \end{bmatrix} = \begin{bmatrix} \dfrac{V_e^d}{\sum_{i=1}^N \Psi_i - V_e^q i_e^q} \left( \Psi_i - \dfrac{V_e^q i_e^q}{N} \right) \\ \dfrac{V_e^q}{N} \end{bmatrix} \qquad (42)$$

A complementary improvement may also be made.

If we consider equation (23a), and if we suppose that the components (d, q) of the distributed voltages $V_{ei}$ are not known precisely, but are estimated as $\hat{V}_{ei}^d$ and $\hat{V}_{ei}^q$, where:

$$\begin{cases} \hat{V}_{ei}^d = V_{ei}^d + \Delta V_{ei}^d \\ \hat{V}_{ei}^q = V_{ei}^q + \Delta V_{ei}^q \end{cases} \qquad (43)$$

where $\Delta V_{ei}^d$ and $\Delta V_{ei}^q$ are estimating errors on each component. Substituting equations (24) and (43) in equation (25), we get:

$$\frac{d}{dt} Z_i = -\frac{2}{R_{pi} C_i} Z_i + \frac{2}{C_i} \Psi_i + \frac{2}{C_i} (\Delta V_{ei}^d i_e^d + \Delta V_{ei}^e i_e^q) \qquad (44)$$

Since the voltage components q are close to zero by comparison with the voltage components d, the estimating errors can be considered to be around zero $\Delta V_{ei}^q \cong 0$. Equation (44) can then be rewritten as:

$$\frac{d}{dt} Z_i = -\frac{2}{R_{pi} C_i} Z_i + \frac{2}{C_i} \Psi_i + \frac{2}{C_i} \Delta V_{ei}^d i_e^d \qquad (45)$$

Using the same procedure as for the low speed synthesis g of the voltage and using the same Lyapunov function, we get the following differential equation:

$$\frac{d}{dt} V_{Lyap} = E_{Zi} \left( -\frac{2}{R_{pi} C_i} Z_i + \frac{2}{C_i} \Psi_i - \frac{d}{dt} Z_{i\_ref} + \frac{2}{C_i} \Delta V_{ei}^d i_e^d \right) \qquad (46)$$

The above equation is defined as negative by choosing the following voltage control law and the estimating error of adaptive power control:

$$\Psi_i = \frac{C_i}{2}\left(\frac{2}{R_{pi}C_i}Z_i + \frac{d}{dt}Z_{i\_ref} - K_{1Zi}E_{Zi} - K_{2Zi}sign(E_{Zi})\right) \quad (47)$$

$$\Delta V_{ei}^d = k_{PLLi}\frac{2}{C_i i_e^d}\int_0^t E_{Zi}dt \quad (48)$$

where $K_{1zi}$, $K_{2zi}$ and $K_{PLLi}$ are adjustment gains. Equation (48) can be configured without detriment to the analysis of overall stability, as follows:

$$\Delta V_{ei}^d = K_{PLLi}\int_0^t E_{Zi}dt \quad (49)$$

where $K_{PLLi}$ are adjustment gains. The above quantity may be added directly to the components d of each distributed voltage corresponding to each cell.

Instead of correcting each distributed voltage by its components d, it is possible to modify the component d of the total voltage directly. The voltage components obtained are then used for calculating the current reference $i_{e\_ref}^d$ and the distributed voltages.

The component d of total voltage is recalculated by using the output d of the PLL loop $V_{ePLL}^d$ and the correction term $\Delta V_e^d$, to give:

$$\begin{aligned} V_e^d &= \sum_{i=1}^{N}(V_{ei}^d + \Delta V_{ei}^d) \\ &= \sum_{i=1}^{N}V_{ei}^d + \sum_{i=1}^{N}\Delta V_{ei}^d \\ &= V_{ePLL}^d + \sum_{i=1}^{N}\left(K_{PLLi}\int_0^t E_{Zi}dt\right) \end{aligned} \quad (50)$$

If we suppose that the same adaptive gain is used for each cell, we get:

$$V_e^d = V_{ePLL}^d + K_{PLL}\sum_{i=1}^{N}\left(\int_0^t E_{Zi}dt\right) \quad (51)$$

EXAMPLE

Figure 6:
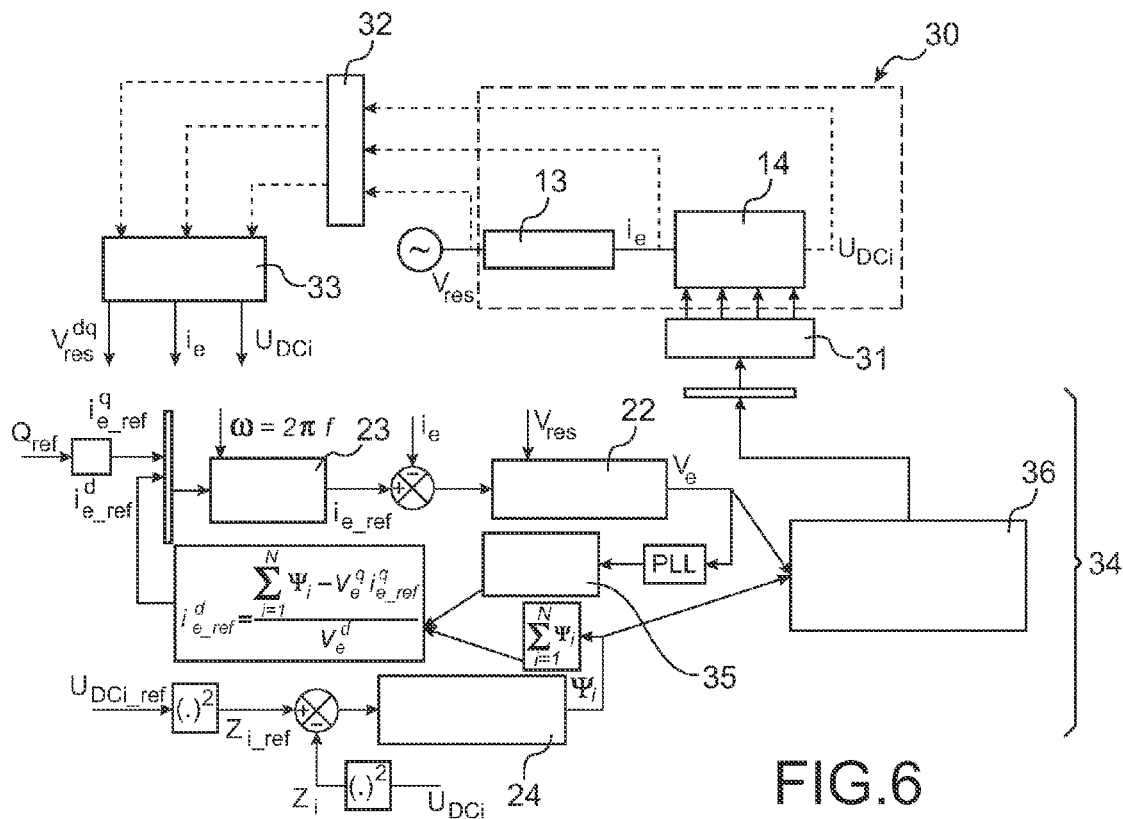
FIG. 6 shows one embodiment of the system of the invention.

In one example of the embodiment with a system having four cells 12, the control system of the invention is shown in FIG. 6. The voltages distributed from the cells 12, with H (four-arm) bridges, are generated using method 1 described above, because method 2 is very sensitive to harmonics and must be used where $i_e^q \cong 0$. FIG. 6 shows the devices already shown in FIG. 4.

The system of the invention, which here has the reference numeral 30, is connected to the input of a pulse width modulation (PWM) generator 31, and is connected at its output to measuring sensors 32 and to a data collecting device 33. Here, the control law 34 includes correction of phase locked loop (PLL) error at 35, and an algorithm 36 for generating distributed voltages $[v_{ei}^d v_{ei}^q]^T$.

This example enables the performance of the control system of the invention to be measured. In order to show how strongly the control law of the invention performs, various values of capacitors are used for the direct current (DC) bus in the STATCOM system ($C_1$=1.2 $C_N$, $C_2$=$C_N$, $C_3$=$C_N$ and $C_4$=0.8 $C_N$), and the control law is deduced with a common nominal value $C_N$ of 18 mF for all the capacitors. Three types of result are obtained in this way, as follows.

1. Control Law with Phase Locked Loop (PLL) Correction

Figure 8A:
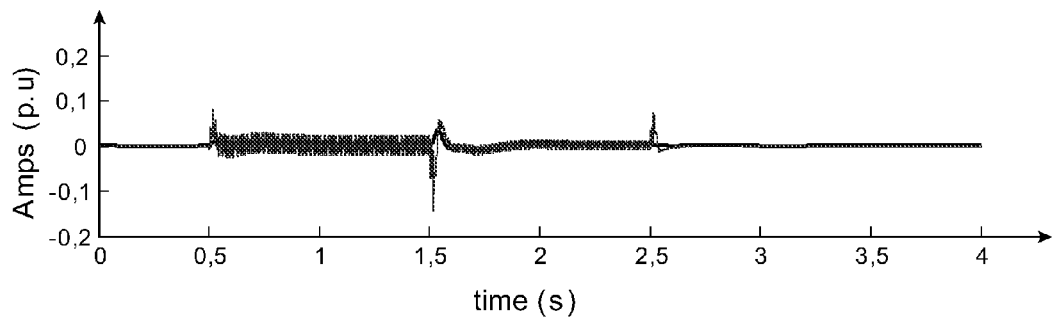
FIGS. 8A to 18C show various results that demonstrate the performance of the embodiment shown in FIG. 6.
Figure 8B:
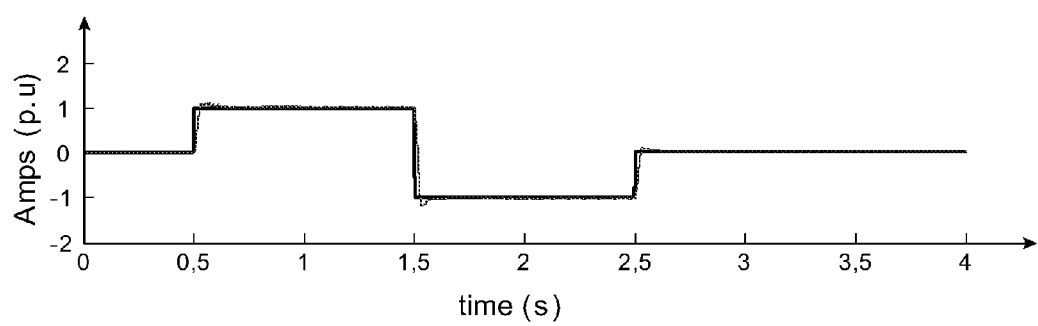
Figure 8C:
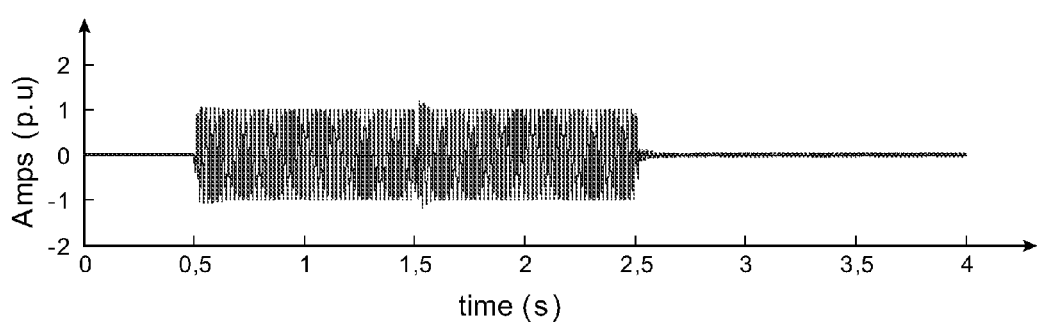

FIGS. 8A, 8B and 8C show AC current control with its corresponding components d (in FIG. 8A) and q (in FIG. 8B):
At 0.5 second, 1 p.u. of reactive current is demanded;
At 1.7 second, the control reference is changed from 1 p.u. to −1 p.u. of reactive current.

Figure 9A:
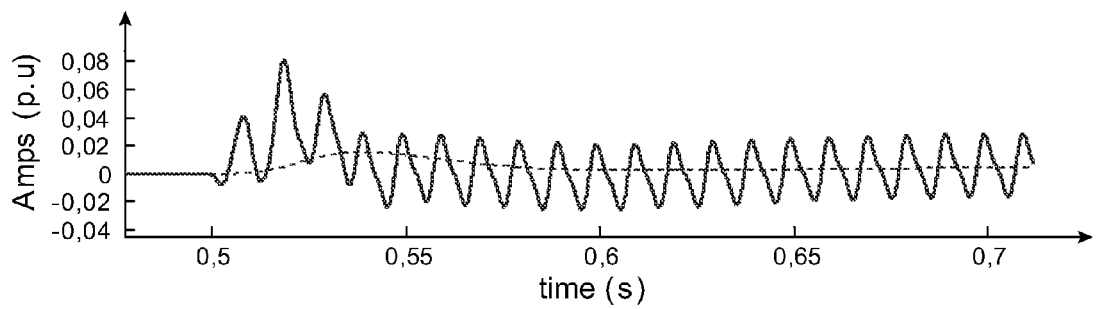
Figure 9B:
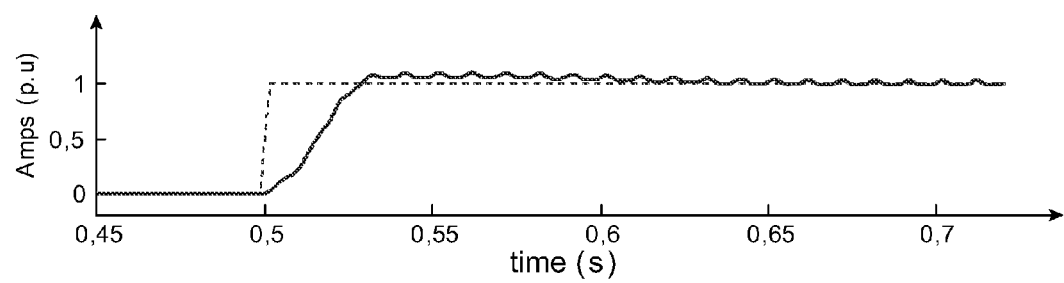
Figure 9C:
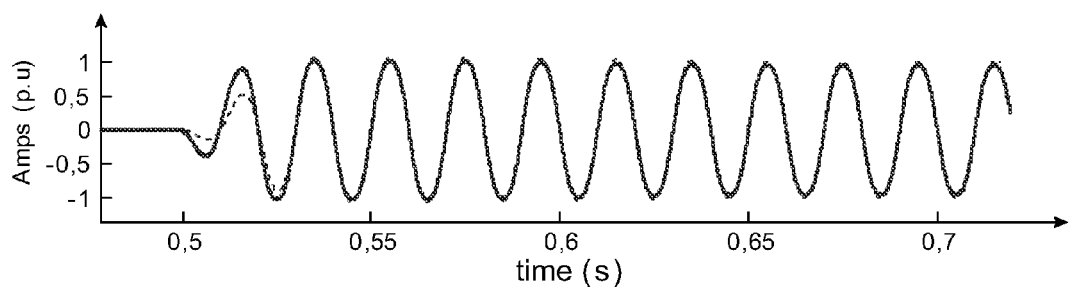

FIG. 8C shows the values of current that are calculated and measured. FIGS. 9A, 9B and 9C are a "zoom" version (i.e. a version with the time scale stretched) of a portion of FIGS. 8A, 8B and 8C respectively, around the 0.5 second mark.

Figure 10A:
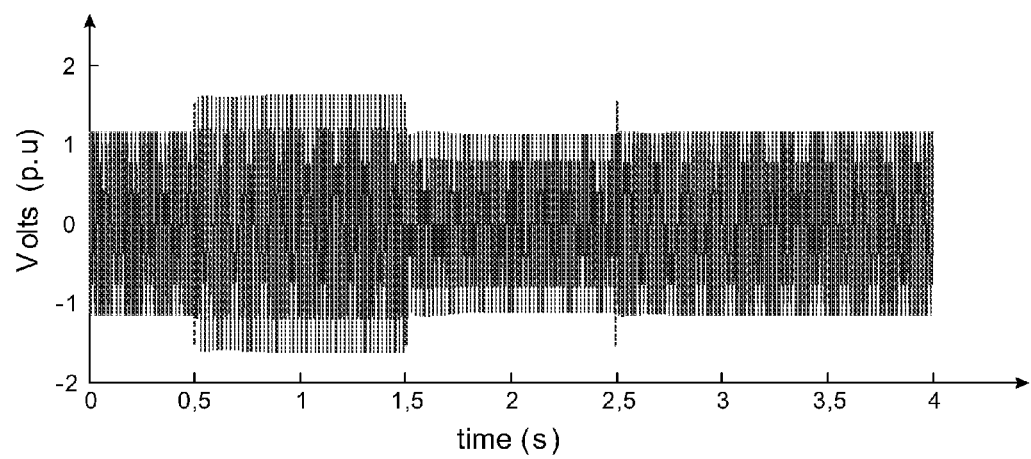
Figure 10B:
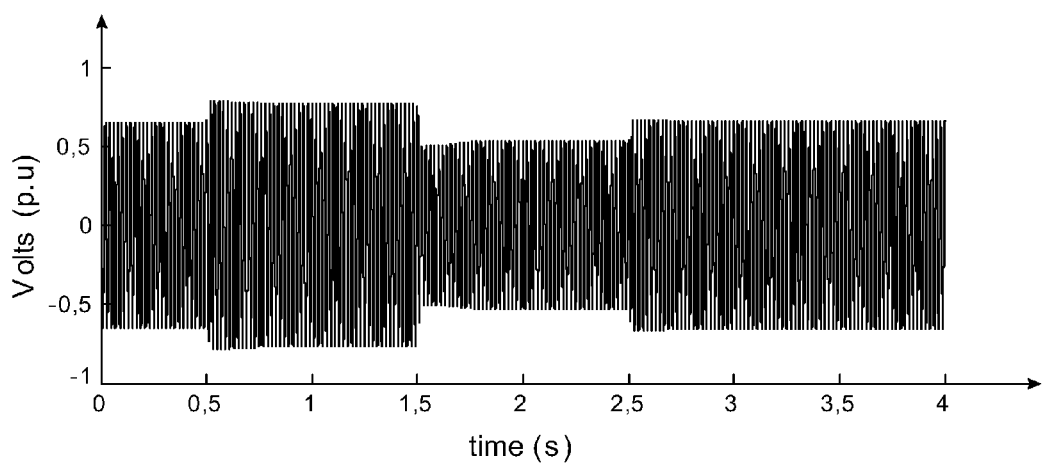
Figure 11A:
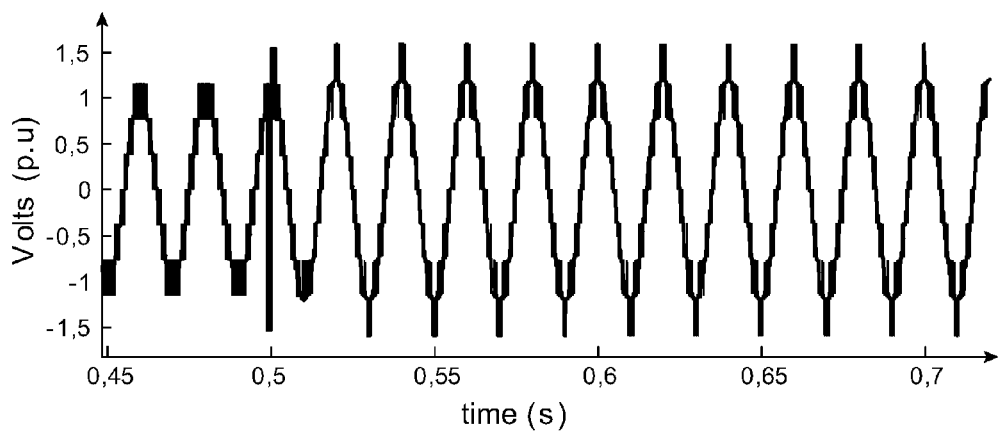
Figure 11B:
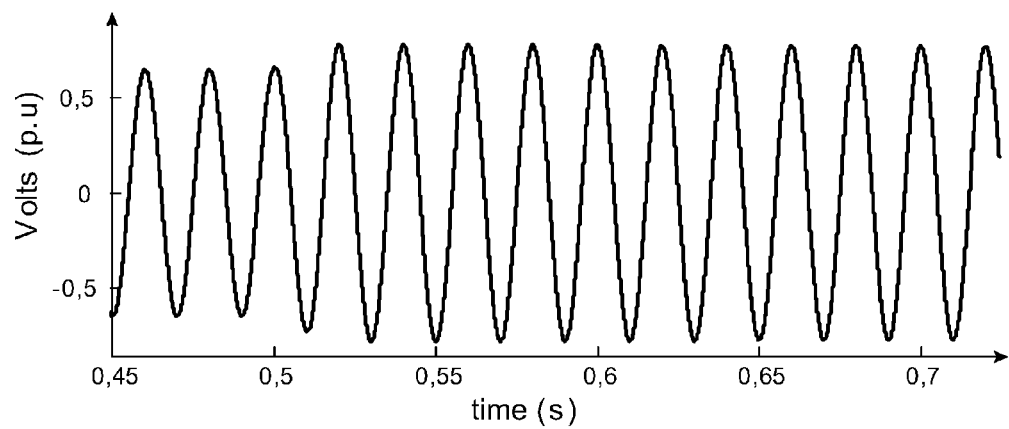

The corresponding AC voltage and the control inputs of the DC cells are shown in FIGS. 10A and 10B respectively. FIGS. 11A and 11B are a "zoom" version of FIGS. 10A and 10B, again around the 0.5 second mark.

Figure 12A:
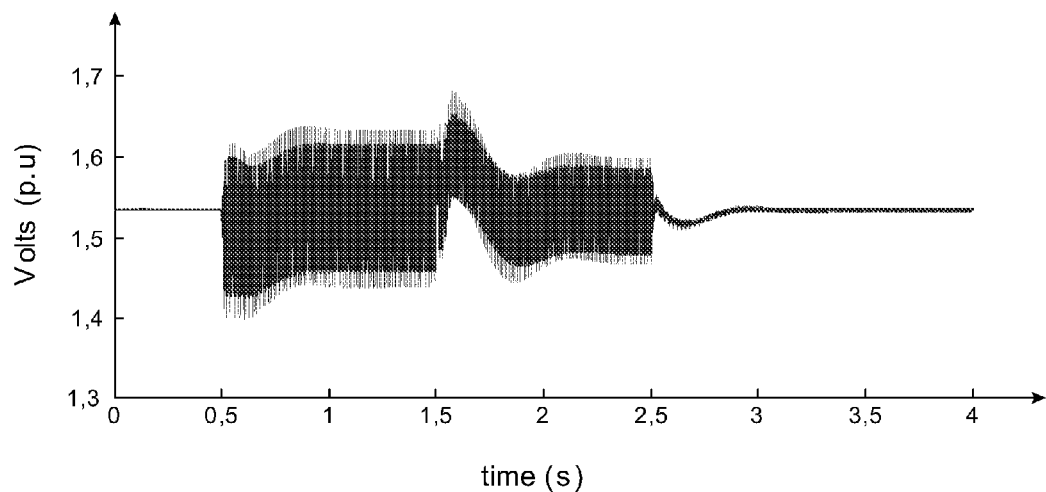
Figure 12B:
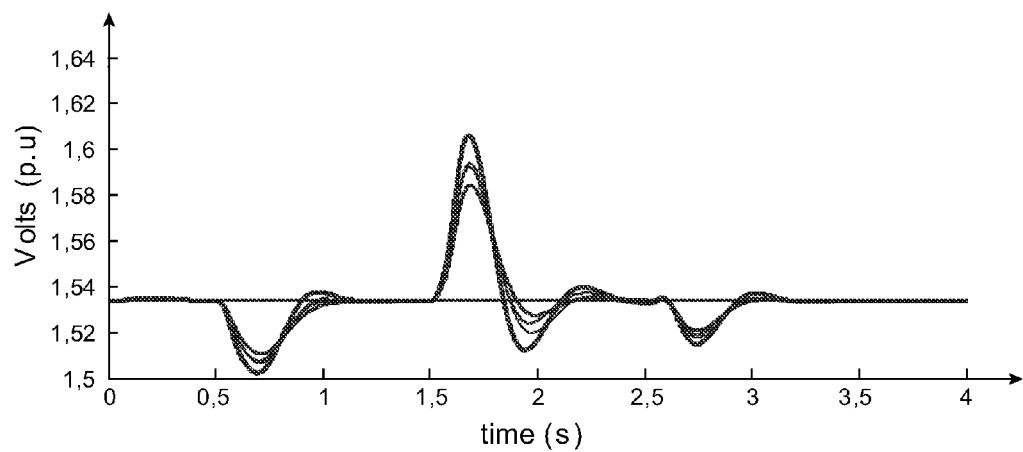
Figure 13A:
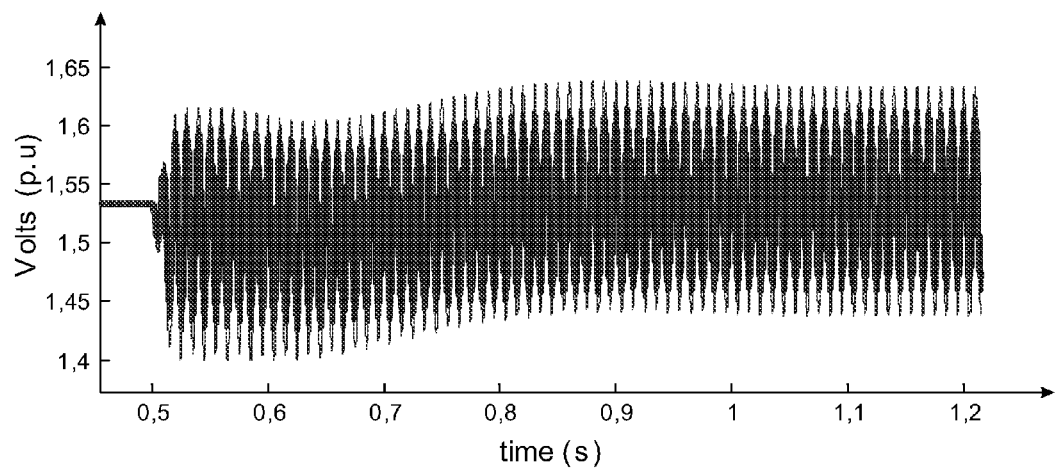
Figure 13B:
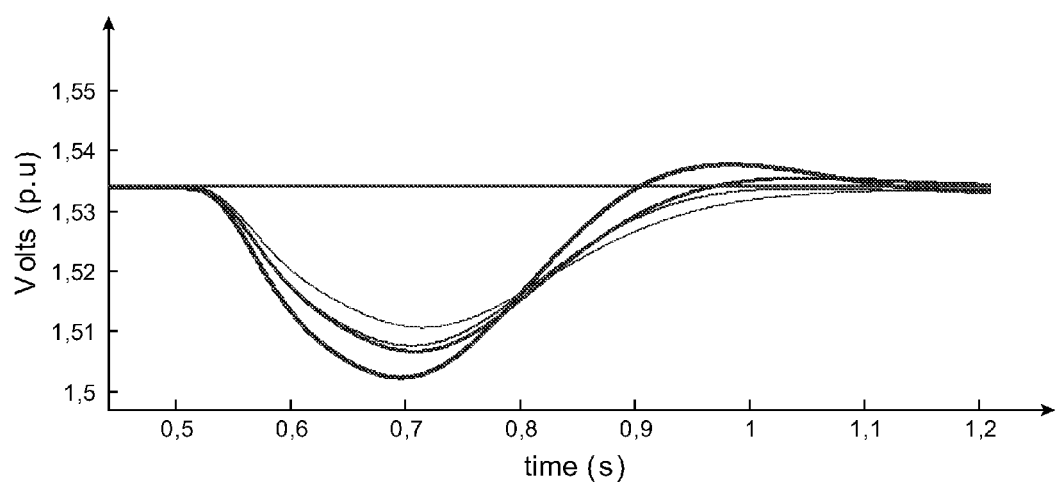

FIGS. 12A and 12B show, respectively, the DC voltages and the filtered DC voltages with the reference voltage. FIGS. 13A and 13B are a "zoom" version of FIGS. 12A and 12B, once again around the 0.5 second mark.

It may be noticed that the results thus obtained are very good in terms of dynamic (speed of response) and in terms of the strength of the control law concerned.

2. Control Law with no PLL ConnectionU

Figure 14A:
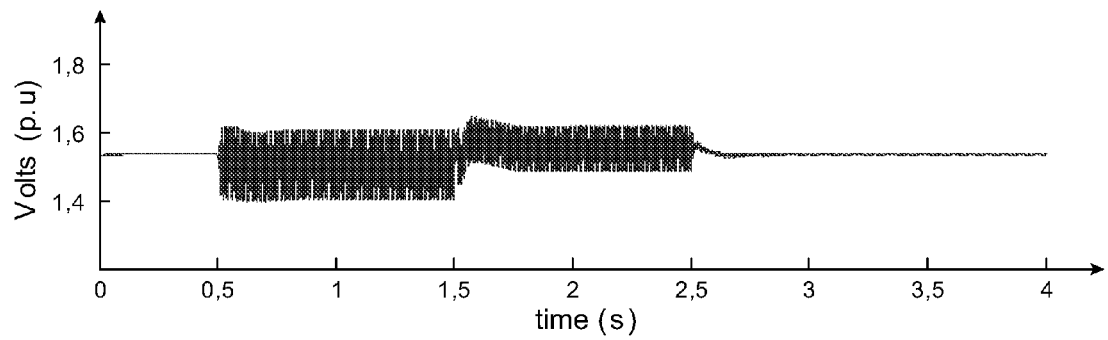
Figure 14B:
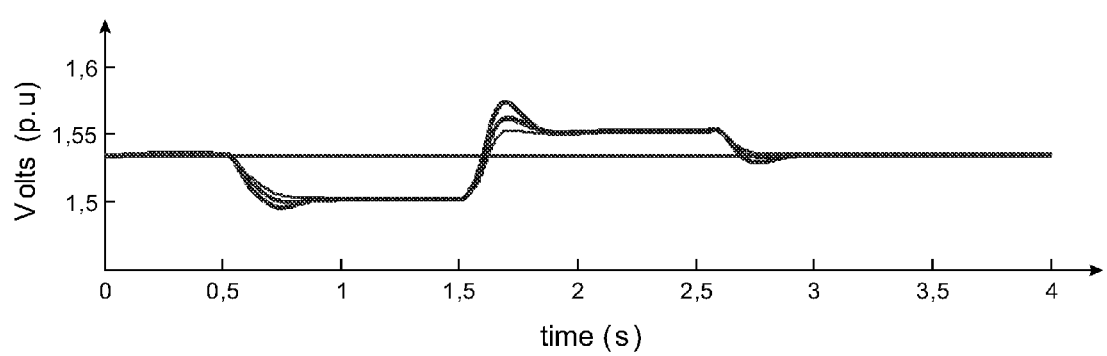
Figure 14C:
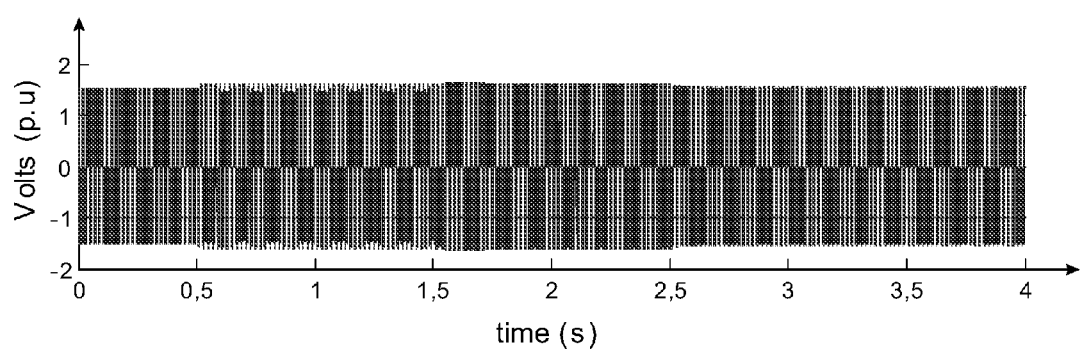

Making use of this control law gives rise to errors during normal operation for the DC bus voltages. It can be shown that, even if the phase locked loop (PLL) has low performance, the proposed connection of the outputs of the phase locked loop is able to compensate for disturbances and uncertainties in control. FIGS. 14A, 14B and 14C show, respectively, DC voltages, filtered DC voltages with a reference voltage (with no PLL correction), and corresponding AC H-bridge voltages.

3. Comparison with a Prior Art Control Law

In order to measure the performance of the control law of the invention, this law is compared with a control law that is set out in the document referenced [1].

Figure 15A:
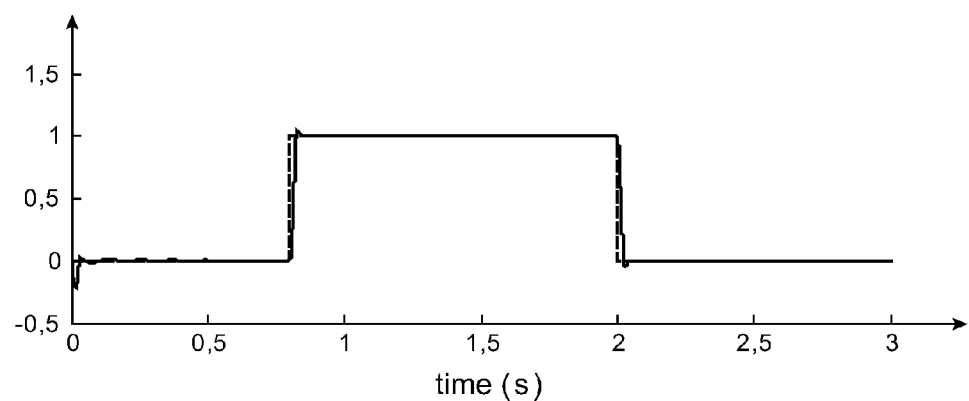
Figure 15B:
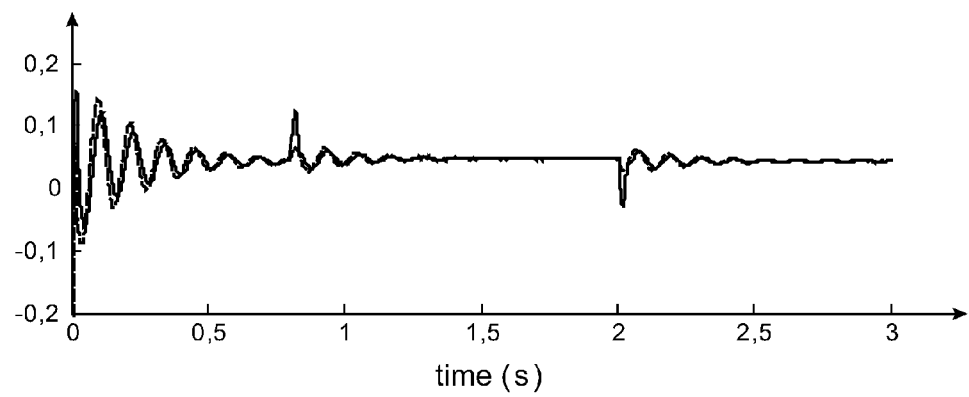
Figure 16A:
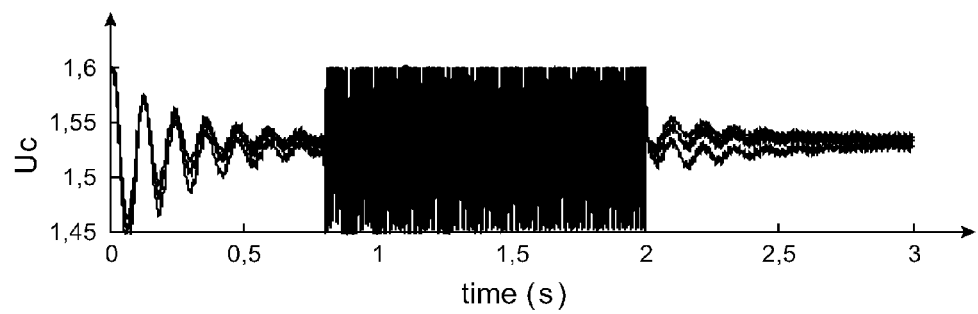
Figure 16B:
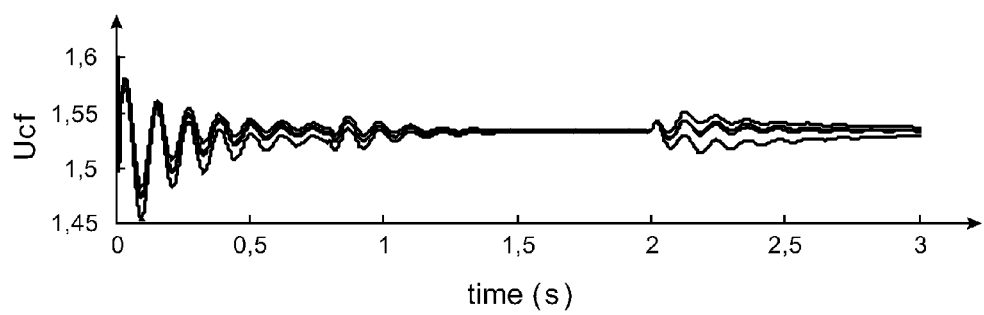
Figure 16C:
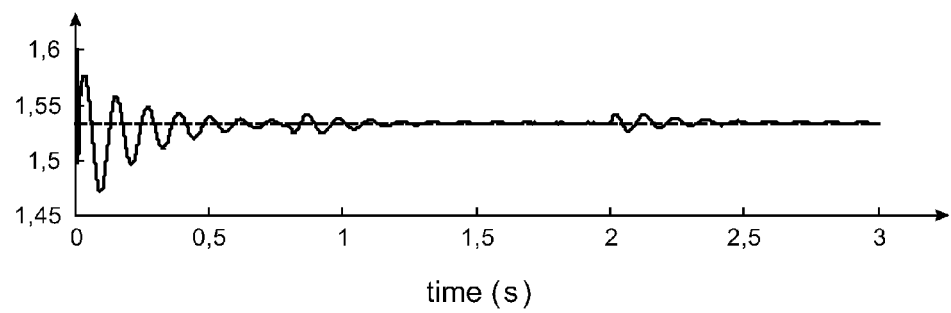

In that document, the control of the cells is worked out around a mean value, and a control correction is added to each cell if the value is different from the reference value. This justifies the dispersions obtained in the DC voltages around the mean value illustrated in FIGS. 16A, 16B and 16C, which can create instability in the control law. Current control, using the technique described in said document, is illustrated in FIG. 15A (current iq) and FIG. 15B (current id).

Figure 17A:
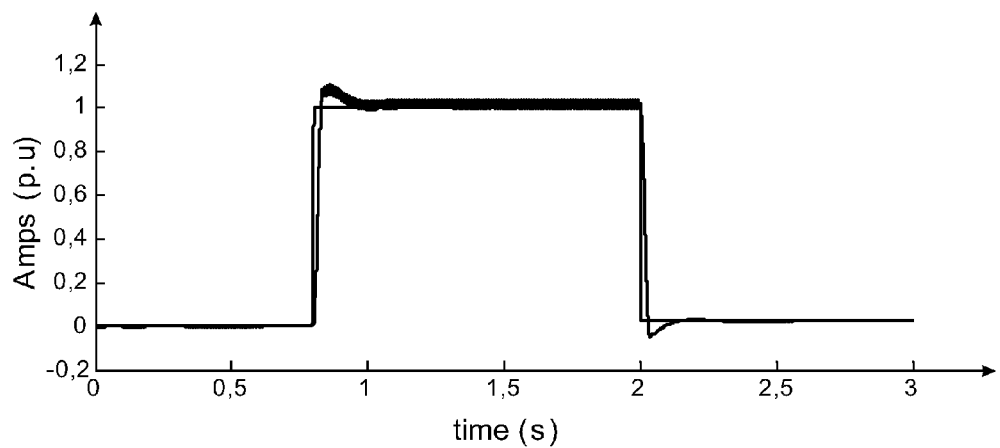
Figure 17B:
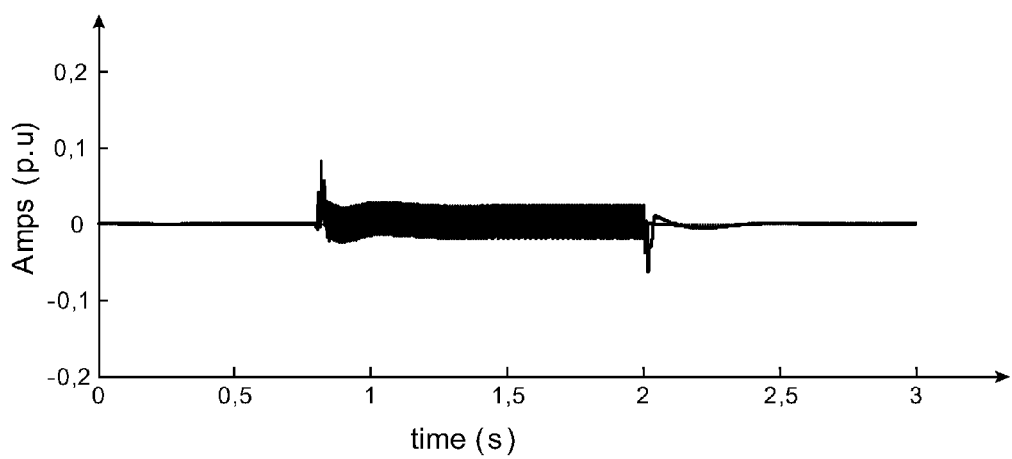
Figure 18A:
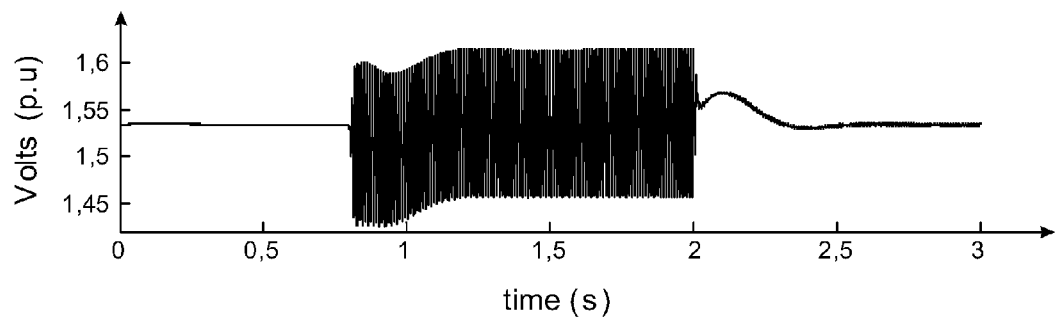
Figure 18B:
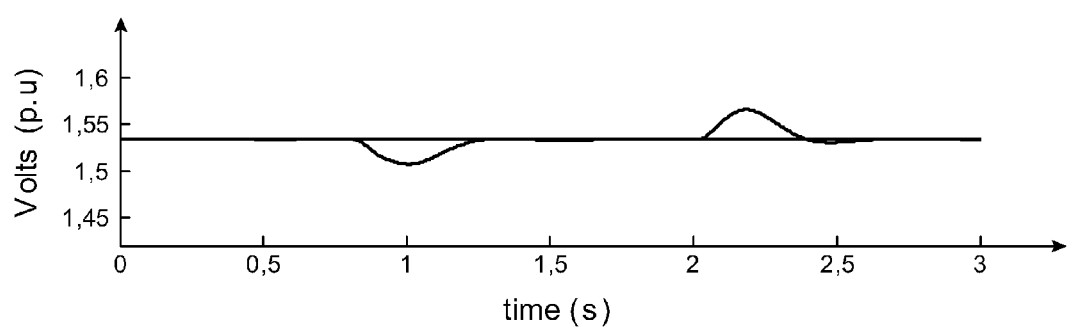
Figure 18C:
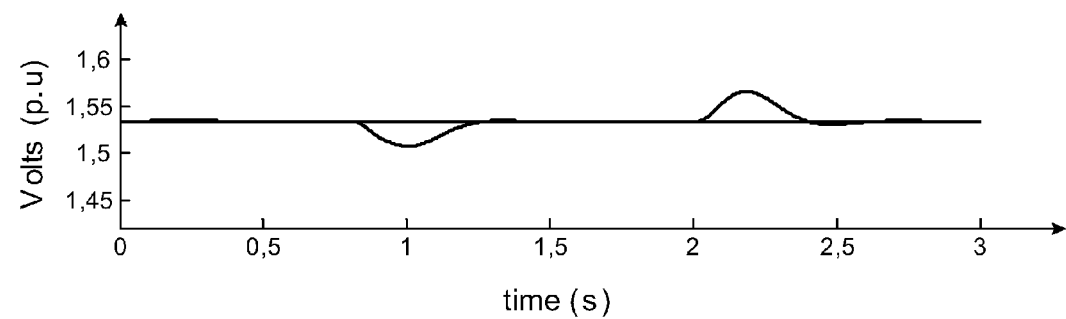

On the contrary, as illustrated in FIGS. 18A-18C, the DC voltages are well controlled in using the invention control law. The FIG. 18A illustrates DC voltages, the FIG. 18B illustrates filtered DC voltages and the reference voltage, the FIG. 18C illustrates the mean DC voltage and the reference voltage. The corresponding current control is illustrated in FIGS. 17A (current iq) and 17B (current id).

Example of a Three-phase Version

Figure 7:
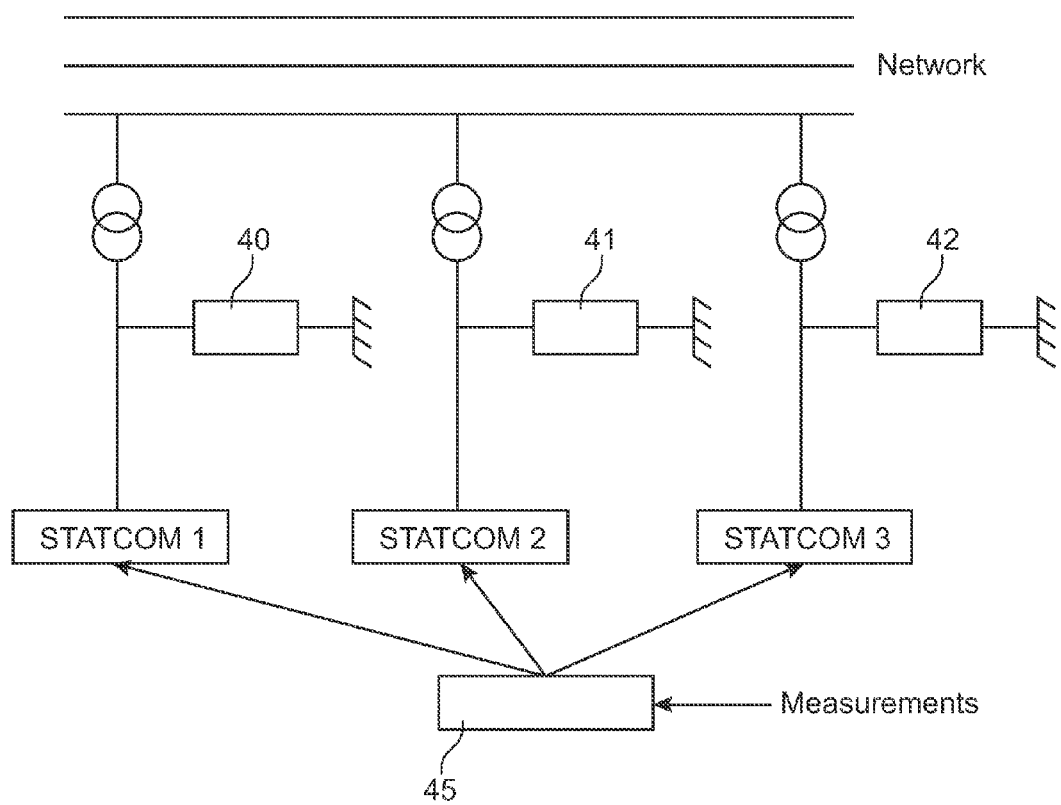
FIG. 7 shows a three-phase configuration that makes use of the method of this invention.

FIG. 7 shows a three-phase chain link STATCOM configuration making use of the method of the invention, and shows single-phase STATCOMS, namely STATCOM 1, STATCOM 2 and STATCOM 3, together with filters 40, 41 and 42 and a computer 45 for receiving the measurements.

REFERENCES

[1] "Industrial D-STATCOM Chain Link Modeling and Control" by A. Benchaib, E. Lee-Kwet-Sun, J.-L. Thierry and G. de Preville (12$^{th}$ European Conference on Power Electronics and Applications, EPE 2007, Aalborg, Denmark, 2-5 Sep. 2007).

[2] "Analysis and Performance Investigation of a Cascaded Multilevel STATCOM for Power System Voltage Regulation" by Nitrus Voraphonpiput, Teratam Bunyagul and Somchai Chatratana (*Energy for Sustainable Development*, March 2006).

The invention claimed is:

1. A control system for at least one voltage converter having a plurality of cells in series wherein a module and phase components of an input voltage Vei relative to a frame of reference (d, q) are delivered to each cell, comprising an AC part and a DC part, characterized in that it includes a high speed current control loop relating to the AC part that delivers a control voltage Ve, and a lower speed voltage control loop relating to the cells that delivers an active power ψi, such that:

$$\Psi_i = \frac{C_i}{2}\left(\frac{2}{R_{pi}C_i}Z_i + \frac{d}{dt}Z_{i\_ref} - K_{1Zi}E_{Zi} - K_{2Zi}\text{sign}(E_{Zi})\right)$$

where:
$K_{1zi}$ and $K_{2zi}$ are positive adjustment gains;
$C_i$ is a continuous capacitance of a capacitor Ci of each cell;
$R_{pi}$ is losses associated with each cell;
$Z_{i\_ref}$ is a referenced value of Zi=$(U_{DCi})^2$, $U_{DCi}$ being a direct voltage across the capacitor $C_i$; and
$E_{Zi}$ is such that $E_{Zi}=Z_i-Z_{i\_ref}$,
in that a link between these two control loops is obtained via a consumption of active power in the cells representing an output of the lower speed control loop,
in that it comprises means for obtaining a current reference $i_{e\_ref}^d$ for the high speed control loop, by effecting a summation $\Sigma\psi_i$ of the active power consumptions in N cells with $$i_{e\_ref}^d = \frac{\sum_{i=1}^{N}\Psi_i - V_e^q i_{e\_ref}^q}{V_e^d},$$

and by making use of a phase locked loop on the control voltage $V_e$, and including a module for error correction in the phase locked loop, such that the control voltage Ve, which is a total output voltage component (Ve) of the AC part, is given by the following equation:

$$V_e = V_{ePLL} + K_{PLL}\sum_{i=1}^{N}\left(\int_0^1 E_{Zi}dt\right)$$

where:
$V_{ePLL}$ is an output of the phase locked loop;

$$K_{PLL}\sum_{i=1}^{N}\left(\int_0^1 E_{Zi}dt\right)$$

is a correction term;
$K_{PLL}$ is an adjustment gain; and
$E_{Zi}$ is an error in tracking a square of the DC voltage.

2. A system according to claim 1, including a phase locked loop on the total output voltage component (Ve) of the AC part.

3. A system according to claim 1 including a module for delivering to the cells module and phase components relative to a frame of reference (d, q).

4. A system according to claim 1, comprising a chain link STATCOM converter on each phase of a three-phase power distribution network.

5. A method of controlling at least one voltage converter having a plurality of cells in series, wherein a module and phase components of an input voltage Vei relative to a frame of reference (d, q) are delivered to each cell, comprising an AC part and a DC part, characterized in that the AC input voltage (Vei) of each cell is determined directly by a use of a high speed current control loop relating to the AC part that delivers a control voltage Ve and a lower speed voltage control loop relating to the cells that delivers an active power ψi, such that:

$$\Psi_i = \frac{C_i}{2}\left(\frac{2}{R_{pi}C_i}Z_i + \frac{d}{dt}Z_{i\_ref} - K_{1Zi}E_{Zi} - K_{2Zi}\text{sign}(E_{Zi})\right)$$

where:
$K_{1zi}$ and $K_{2zi}$ are positive adjustment gains;
$C_i$ is a continuous capacitance of a capacitor Ci of each cell;
$R_{pi}$ is losses associated with each cell;
$Z_{i\_ref}$ is a referenced value of Zi=$(U_{DCi})^2$, $U_{DCi}$ being a direct voltage across the capacitor $C_i$; and
$E_{Zi}$ is such that $E_{Zi}=Z_i-Z_{i\_ref}$,
in that a link between the two control loops is obtained via a consumption of active power in the cells representing an output of the lower speed control loop, and in that a current reference $i_{e\_ref}^d$ is derived for the high speed control loop, by effecting a summation $\Sigma\psi_i$ of the active power consumptions in N cells with $$i_{e\_ref}^d = \frac{\sum_{i=1}^{N}\Psi_i - V_e^q i_{e\_ref}^q}{V_e^d},$$

and by making use of a phase locked loop on the control voltage $V_e$; and wherein use is made of error correction in the phase locked loop, such that the control voltage, which is a total output voltage component (Ve) of the AC part, is given by the following equation:

$$V_e = V_{ePLL} + K_{PLL}\sum_{i=1}^{N}\left(\int_0^1 E_{Zi}dt\right)$$

where:
$V_{ePLL}$ is an output of the phase locked loop;

$$K_{PLL}\sum_{i=1}^{N}\left(\int_0^1 E_{Zi}dt\right)$$

is a correction term;
$K_{PLL}$ is an adjustment gain; and
$E_{Zi}$ is an error in tracking a square of the DC voltage.

6. A method according to claim 5, including the use of a phase locked loop on the total output voltage component (Ve) of the AC part.

7. A method according to claim 5, wherein a chain link STATCOM converter is used on each phase of a three-phase power distribution network.

* * * * *

UNITED STATES PATENT AND TRADEMARK OFFICE
CERTIFICATE OF CORRECTION

PATENT NO. : 8,531,852 B2  Page 1 of 1
APPLICATION NO. : 13/125046
DATED : September 10, 2013
INVENTOR(S) : Benchaib et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Fifteenth Day of September, 2015

Michelle K. Lee
*Director of the United States Patent and Trademark Office*